(12) United States Patent
Yi et al.

(10) Patent No.: US 10,970,427 B2
(45) Date of Patent: Apr. 6, 2021

(54) PERFORMANCE ALARMING METHOD FOR BRIDGE EXPANSION JOINTS BASED ON TEMPERATURE DISPLACEMENT RELATIONSHIP MODEL

(71) Applicant: DALIAN UNIVERSITY OF TECHNOLOGY, Dalian (CN)

(72) Inventors: Tinghua Yi, Dalian (CN); Haibin Huang, Dalian (CN); Hongnan Li, Dalian (CN)

(73) Assignee: Dalian University of Technology, Liaoning (CN)

( * ) Notice: Subject to any disclaimer, the term of this patent is extended or adjusted under 35 U.S.C. 154(b) by 266 days.

(21) Appl. No.: 16/336,807

(22) PCT Filed: Mar. 14, 2018

(86) PCT No.: PCT/CN2018/078927
§ 371 (c)(1),
(2) Date: Mar. 26, 2019

(87) PCT Pub. No.: WO2019/001016
PCT Pub. Date: Jan. 3, 2019

(65) Prior Publication Data
US 2019/0228117 A1  Jul. 25, 2019

(30) Foreign Application Priority Data

Jun. 26, 2017 (CN) .......................... 201710482859.4

(51) Int. Cl.
*G06F 30/13* (2020.01)
*E01D 19/06* (2006.01)
(Continued)

(52) U.S. Cl.
CPC ............. *G06F 30/13* (2020.01); *E01D 19/06* (2013.01); *G06F 17/15* (2013.01); *G06F 17/16* (2013.01); *G06F 30/20* (2020.01)

(58) Field of Classification Search
None
See application file for complete search history.

(56) References Cited

U.S. PATENT DOCUMENTS

2018/0268091 A1* 9/2018 Arisoy .................... B33Y 50/00
2021/0001399 A1* 1/2021 Bullied ................... G06F 30/20

FOREIGN PATENT DOCUMENTS

CN  101782372 A  7/2010
CN  103712586 A  4/2014
(Continued)

*Primary Examiner* — Craig C Dorais
(74) *Attorney, Agent, or Firm* — Muncy, Geissler, Olds & Lowe, P.C.

(57) ABSTRACT

The present invention belongs to the technical field of health monitoring for civil structures, and a performance alarming method for bridge expansion joints based on temperature displacement relationship model is proposed. First, the canonically correlated temperature is proposed to maximize the correlation between bridge temperature field and expansion joint displacement; second, a temperature displacement relationship model for bridge expansion joints is established based on canonically correlated temperatures; then, a mean-value control chart is constructed to the error of temperature displacement relationship model; finally, reasonable control limits are determined for the mean-value control chart. A more accurate temperature displacement relationship model can be established based on canonically correlated temperatures, which is of important value to improve the performance alarming ability for expansion joint.

1 Claim, 1 Drawing Sheet

Maximize Correlation

(51) Int. Cl.
*G06F 17/16* (2006.01)
*G06F 17/15* (2006.01)
*G06F 30/20* (2020.01)

(56) References Cited

FOREIGN PATENT DOCUMENTS

| CN | 105507139 A | 4/2016 |
| CN | 107169241 A | 9/2017 |

\* cited by examiner

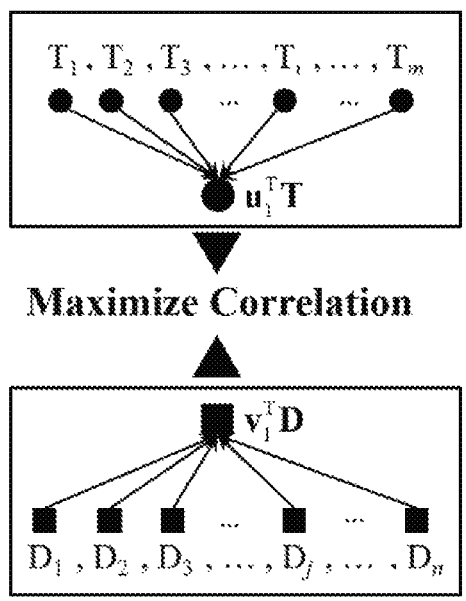

PERFORMANCE ALARMING METHOD FOR BRIDGE EXPANSION JOINTS BASED ON TEMPERATURE DISPLACEMENT RELATIONSHIP MODEL

TECHNICAL FIELD

The present invention belongs to the technical field of health monitoring for civil structures, and a performance alarming method for bridge expansion joints based on temperature displacement relationship model is proposed.

BACKGROUND

Expansion joints are key components for long-span bridges, mainly used to accommodate longitudinal main girder movements caused by various factors, e.g., temperature variations, wind and traffic loads, and so forth. In general, the service life of expansion joints is much shorter than that of bridges, and their premature performance degradation can have various adverse effects on bridges. For example, the restriction of longitudinal main girder movements may destroy the girder end; the sealing capacity degradation of expansion joints will lead to the corrosion of concrete and steel materials; and so forth. Therefore, it is of important and practical significance to establish expansion joint performance alarming method based on real-time monitoring data, for understanding the operational performance of expansion joints and ensuring the safe operation of bridges.

Previous studies have indicated that, expansion joint displacement is mainly induced by variations of temperature field. Therefore, a relationship model between bridge temperature field and expansion joint displacement can be established based on the existing long-term monitoring data, and it can be decided that there is performance degradation in expansion joints if new monitoring data does not match the model. A key issue in establishing the temperature displacement relationship model for bridge expansion joints concerns how to quantitatively characterize the bridge temperature field, that is, to calculate representative temperatures using the monitoring data acquired from a dense array of temperature sensors. Up to now, there are three types of traditional methods for representative temperature calculation: the effective temperature, the mean temperature and principal components of temperatures. Essentially speaking, representative temperatures are different linear combinations of temperature monitoring data. However, traditional methods for representative temperature calculation only focus on temperature monitoring data itself, while ignoring the correlation between bridge temperature field and expansion joint displacement. If a set of linear combination coefficients can be determined to maximize the correlation between bridge temperature field and expansion joint displacement, the corresponding representative temperature will be more suitable for establishing the temperature displacement relationship model. Based on this, the established performance alarming method for expansion joints will be more practical.

SUMMARY

The present invention aims to propose a novel temperature displacement relationship model, based on that a performance alarming method for bridge expansion joints is established. The technical solution of the present invention is as follows: first, calculate canonically correlated temperatures to maximize the correlation between bridge temperature field and expansion joint displacement; second, establish temperature displacement relationship model for bridge expansion joints based on canonically correlated temperatures; then, construct a mean-value control chart to the error of temperature displacement relationship model; finally, determine reasonable control limit of the mean-value control chart.

A performance alarming method for bridge expansion joints based on temperature displacement relationship model, the specific steps of which are as follows:

Step 1: Calculate Canonically Correlated Temperatures of the Bridge Structure

Acquire T and D of the monitored bridge structure ($T=[T_1, T_2, \ldots, T_m]^T$ represents a measurement sample of m temperature measurement point in the structural health monitoring system, $D=[D_1, D_2, \ldots, D_n]^T$ represents a measurement sample of n expansion joint displacements), calculate the covariance matrix and the cross-covariance matrix of temperature and displacement monitoring data as follows:

$$R_{TT} = \frac{1}{l-1} \sum_{t=1}^{l} \{T(t) - \overline{T}\}\{T(t) - \overline{T}\}^T$$

$$R_{DD} = \frac{1}{l-1} \sum_{t=1}^{l} \{D(t) - \overline{D}\}\{D(t) - \overline{D}\}^T$$

$$R_{TD} = \frac{1}{l-1} \sum_{t=1}^{l} \{T(t) - \overline{T}\}\{D(t) - \overline{D}\}^T$$

$$R_{DT} = \frac{1}{l-1} \sum_{t=1}^{l} \{D(t) - \overline{D}\}\{T(t) - \overline{T}\}^T$$

where $T(t)$ represents the tth temperature measurement sample; $\overline{T}$ represents the mean-vector of temperature data; $D(t)$ represents the tth displacement measurement sample; $\overline{D}$ represents the mean-vector of displacement data; l represents the number of samples; $R_{TT}$ represents the covariance matrix of temperature data; $R_{DD}$ represents the covariance matrix of displacement data; $R_{TD}$ represents the cross-covariance matrix of temperature and displacement data; $R_{DT}$ represents the cross-covariance matrix of displacement and temperature data;

Determine a pair of base vectors, i.e., $u_1$ and $v_1$, to maximize the correlation between the linear combination of temperatures ($u_1^T T$) and the linear combination of displacements ($v_1^T D$), their correlation coefficient is as follows:

$$\rho(u_1, v_1) = \frac{u_1^T R_{TD} v_1}{\sqrt{u_1^T R_{TT} u_1 \cdot v_1^T R_{DD} v_1}}$$

Solving the combination coefficients of the base vectors, which maximize the correlation coefficient, can be described by the following optimization problem:

$$\begin{cases} \max_{u_1, v_1} & u_1^T R_{TD} v_1 \\ \text{s.t.} & u_1^T R_{TT} u_1 = 1 \\ & v_1^T R_{DD} v_1 = 1 \end{cases}$$

Solving the combination coefficients of the subsequent base vectors can also be described by similar optimization problems, and the combination coefficients of all base vectors can be solved by the following eigenvalue decomposition:

$$R_{TT}^{-1} R_{TD} R_{DD}^{-1} R_{DT} = U\Gamma U^T$$

$$R_{DD}^{-1} R_{DT} R_{TT}^{-1} R_{TD} = V\Gamma V^T$$

where $\Gamma = \text{diag}(\gamma_1, \gamma_2, \ldots, \gamma_k)$ is a diagonal eigenvalue matrix; $\gamma_i = \rho^2(u_i, v_i)$ is the ith eigenvalue; $U = [u_1, u_2, \ldots, u_k]$ and $V = [v_1, v_2, \ldots, v_k]$ are eigenvector matrices; $k = \min(m,n)$ is the number of non-zero solutions;

Step 2: Establish the Relationship Model between Canonically Correlated Temperatures and Displacements Define the ith canonically correlated temperature, i.e., $T_{c,i}$ (i=1, 2, ..., k), as follows:

$$T_{c,i} = u_i^T T$$

Establish a temperature displacement relationship model for bridge expansion joints, using canonically correlated temperatures, as follows:

$$\begin{bmatrix} \hat{D}_1 \\ \hat{D}_2 \\ \vdots \\ \hat{D}_n \end{bmatrix} = \begin{bmatrix} \beta_{1,1} & \beta_{1,2} & \cdots & \beta_{1,k} \\ \beta_{2,1} & \beta_{2,2} & \cdots & \beta_{2,k} \\ \vdots & \vdots & \ddots & \vdots \\ \beta_{n,1} & \beta_{n,2} & \cdots & \beta_{n,k} \end{bmatrix} \begin{bmatrix} T_{c,1} \\ T_{c,2} \\ \vdots \\ T_{c,k} \end{bmatrix} + \begin{bmatrix} \beta_{1,0} \\ \beta_{2,0} \\ \vdots \\ \beta_{n,0} \end{bmatrix}$$

where $\hat{D}_i$ represents the estimated displacement of the ith (i=1,2, ..., n) expansion joint; $\beta$ represents the regression coefficient;

Step 3: Construct Control Chart based Alarming Method

Define the error of temperature displacement relationship model as follows:

$$E_i = \hat{D}_i - D_i$$

where $E_i$ represents the model error of the ith (i=1,2, ..., n) expansion joint displacement;

Let $E(t)$ (t=1, 2, ..., l) represent the error sequence of an expansion joint, the mean-value and standard variation of which are as follows:

$$\bar{E} = \frac{1}{l} \sum_{t=1}^{l} E(t)$$

$$\sigma_E = \sqrt{\frac{1}{l-1} \sum_{t=1}^{l} \{E(t) - \bar{E}\}^2}$$

where $\bar{E}$ represents the mean-value of the error sequence; $\sigma_E$ represents the standard variation of the error sequence;

Construct a mean-value control chart to the error sequence to realize performance alarming of expansion joints, and the three parameters of the mean-value control chart are as follows:

$$UCL = \bar{E} + \alpha \sigma_E$$

$$CL = \bar{E}$$

$$LCL = \bar{E} - \alpha \sigma_E$$

where UCL represents the upper control limit; CL represents the center line; LCL represents the lower control limit; $\alpha$ represents a scaling factor which can be determined according to a given significance level;

Step 4: Determine Reasonable Control Limit

Calculate the absolute value of the error sequence, and estimate its probability density function, then obtain the cumulative density function and the inverse cumulative density function. As a result, the control limit of the absolute error sequence, i.e., L, is calculated as:

$$L = F^{-1}(1-\theta)$$

where $F^{-1}(\cdot)$ represents the inverse cumulative density function of the absolute error sequence; $\theta$ represents the significance level;

The calculation formula for the scaling factor $\alpha$ is as:

$$\alpha = \frac{L}{\sigma_E}$$

The upper and lower control limits can then be determined through the scaling factor;

Feed the newly acquired temperature and displacement monitoring data into the temperature displacement relationship model of bridge expansion joints, and the model prediction error of an expansion joint E can be obtained. The criteria for judging performance degradation of expansion joints is as:

$$E > UCL$$

$$E < LCL$$

It can be decided that the performance of expansion joints degrades if the above formula is satisfied.

The present invention has the beneficial effect that: a more accurate temperature displacement relationship model can be established based on canonically correlated temperatures, which is of important value to improve the performance alarming ability for expansion joints.

FIGURE ILLUSTRATION

The sole FIGURE describes the solution process of canonically correlated temperatures.

DETAILED DESCRIPTION

The following details is used to further describe the specific implementation process of the present invention.

The monitoring data of temperatures and expansion joint displacements, acquired during 14 months, from a long-span bridge is used to verify the validity of the present invention. The monitoring data acquired during the first 12 months is used as training dataset, which represents the intact state of expansion joints; whereas the monitoring data acquired during the last 2 months is used as testing dataset, which represents the unknown state of expansion joints.

The detailed implementation process is as follows:

(1) Obtain canonically correlated temperatures from the training dataset (the solution process can be seen in the sole FIGURE), and then establish temperature displacement relationship model for bridge expansion joints using canonically correlated temperatures.

(2) Construct mean-value control chart to the modelling error of the temperature displacement relationship model, and calculate the corresponding upper and lower control limits of the control chart.

(3) Simulate performance degradation of expansion joints in the testing dataset; feed the testing data into the temperature displacement relationship model to obtain the prediction error of the expansion joint displacement; Compare the prediction error with the upper and lower control limits, and trigger a performance alarm when the error falls beyond the control limits; results show that the alarming rate achieves more than 99%, when the performance degradation of expansion joints achieves a severity of 8 mm.

The invention claimed is:

1. A performance alarming method for bridge expansion joints based on temperature displacement relationship model, wherein specific steps of which are as follows:

step 1: calculate canonically correlated temperatures of a bridge structure acquire T and D of the bridge structure, $T=[T_1, T_2, \ldots T_m]^T$ represents a measurement sample of m temperature measurement point in a structural health monitoring system, $D=[D_1, D_2, \ldots, D_n]^T$ represents a measurement sample of n expansion joint displacements, calculate a covariance matrix and a cross-covariance matrix of temperature and displacement monitoring data as follows:

$$R_{TT} = \frac{1}{l-1}\sum_{t=1}^{l}\{T(t)-\overline{T}\}\{T(t)-\overline{T}\}^T$$

$$R_{DD} = \frac{1}{l-1}\sum_{t=1}^{l}\{D(t)-\overline{D}\}\{D(t)-\overline{D}\}^T$$

$$R_{TD} = \frac{1}{l-1}\sum_{t=1}^{l}\{T(t)-\overline{T}\}\{D(t)-\overline{D}\}^T$$

$$R_{DT} = \frac{1}{l-1}\sum_{t=1}^{l}\{D(t)-\overline{D}\}\{T(t)-\overline{T}\}^T$$

where $T(t)$ represents a tth temperature measurement sample; $\overline{T}$ represents a mean-vector of temperature data; $D(t)$ represents a tth displacement measurement sample; $\overline{D}$ represents a mean-vector of displacement data; l represents a number of samples; $R_{TT}$ represents a covariance matrix of temperature data; $R_{DD}$ represents a covariance matrix of displacement data;

$R_{TD}$ represents a cross-covariance matrix of temperature and displacement data;

$R_{DT}$ represents a cross-covariance matrix of displacement and temperature data:

determine a pair of base vectors, i.e., $u_1$, and $v_1$, to maximize a correlation between a linear combination of temperatures $u_1^T T$ and a linear combination of displacements $v_1^T D$, their correlation coefficient is as follows:

$$\rho(u_1, v_1) = \frac{u_1^T R_{TD} v_1}{\sqrt{u_1^T R_{TT} u_1 \cdot v_1^T R_{DD} v_1}}$$

solving a combination coefficients of the base vectors, which maximize the correlation coefficient, are described by the following optimization problem:

$$\begin{cases} \max_{u_1, v_1} & u_1^T R_{TD} v_1 \\ \text{s.t.} & u_1^T R_{TT} u_1 = 1 \\ & v_1^T R_{DD} v_1 = 1 \end{cases}$$

solving combination coefficients of subsequent base vectors, and solving the combination coefficients of all base vectors a following eigenvalue decomposition:

$$R_{TT}^{-1} R_{TD} R_{DD}^{-1} R_{DT} = U\Gamma U^T$$

$$R_{DD}^{-1} R_{DT} R_{TT}^{-1} R_{TD} = V\Gamma V^T$$

where $\Gamma = \text{diag}(\gamma_1, \gamma_2, \ldots, \gamma_k)$ is a diagonal eigenvalue matrix; $\gamma_i = \rho^2(u_i, v_i)$ is an ith eigenvalue; $U=[u_1 u_2, \ldots, u_k]$ and $V=[v_1, v_2, \ldots, v_k]$ are eigenvector matrices; $k=\min(n,n)$ is a number of non-zero solutions;

step 2: establish a relationship model between canonically correlated temperatures and displacements define an ith canonically correlated temperature, i.e., $T_{c,i}$ $i=1, 2, \ldots, k$, as follows:

$$T_{c,i} = u_i^T T$$

establish a temperature displacement relationship model for bridge expansion joints, using canonically correlated temperatures, as follows:

$$\begin{bmatrix} \hat{D}_1 \\ \hat{D}_2 \\ \vdots \\ \hat{D}_n \end{bmatrix} = \begin{bmatrix} \beta_{1,1} & \beta_{1,2} & \ldots & \beta_{1,k} \\ \beta_{2,1} & \beta_{2,2} & \ldots & \beta_{2,k} \\ \vdots & \vdots & \ddots & \vdots \\ \beta_{n,1} & \beta_{n,2} & \ldots & \beta_{n,k} \end{bmatrix} \begin{bmatrix} T_{c,1} \\ T_{c,2} \\ \vdots \\ T_{c,k} \end{bmatrix} + \begin{bmatrix} \beta_{1,0} \\ \beta_{2,0} \\ \vdots \\ \beta_{n,0} \end{bmatrix}$$

where $\hat{D}_i$ represents an estimated displacement of the ith expansion joint, $i=1, 2, \ldots, n$; $\beta$ represents a regression coefficient;

step 3: construct control chart based alarming method define an error of temperature displacement relationship model as follows:

$$E_i = \hat{D}_i - D_i$$

where $E_i$ represents the error of temperature displacement relationship model of an ith expansion joint displacement, $i=1, 2, \ldots, n$;

let $E(t)$ represent an error sequence of an expansion joint, $t=1, 2, \ldots, l$, a mean-value and a standard variation of which are as follows:

$$\overline{E} = \frac{1}{l}\sum_{t=1}^{l} E(t)$$

$$\sigma_E = \sqrt{\frac{1}{l-1}\sum_{t=1}^{l}\{E(t)-\overline{E}\}^2}$$

where $\overline{E}$ represents a mean-value of the error sequence; $\sigma_E$ represents a standard variation of the error sequence;

construct a mean-value control chart to the error sequence to realize performance alarming of expansion joints, and three parameters of the mean-value control chart are as follows:

$$\text{UCL} = \overline{E} + \alpha\sigma_E$$

$$CL = \bar{E}$$

$$LCL = \bar{E} - \alpha \sigma_E$$

where UCL represents an upper control limit; CL represents a center line; LCL represents a lower control limit; $\alpha$ represents a scaling factor which can be determined according to a given significance level;

step 4: determine reasonable control limit calculate an absolute value of the error sequence, and estimate its probability density function, then obtain a cumulative density function and an inverse cumulative density function: as a result, a control limit of the absolute value of the error sequence, i.e., L, is calculated as:

$$L = F^{-1}(1-\theta)$$

where $F^{-1}(\cdot)$ represents an inverse cumulative density function of the absolute value of the error sequence; $\theta$ represents a significance level;

a calculation formula for the scaling factor $\alpha$ is as:

$$\alpha = \frac{L}{\sigma_E}$$

the upper and lower control limits can then he determined through the scaling factor;

feed a newly acquired temperature and displacement monitoring data into the temperature displacement relationship model of bridge expansion joints, and a model prediction error of an expansion joint E can be obtained; criteria for judging performance degradation of expansion joints is as:

$$E > UCL$$

$$E < LCL$$

determining that the performance of expansion joints degrades when E>UCL and/or E<LCL.

\* \* \* \* \*